United States Patent
Alizadeh-Shabdiz et al.

(10) Patent No.: US 8,279,114 B2
(45) Date of Patent: *Oct. 2, 2012

(54) METHOD OF DETERMINING POSITION IN A HYBRID POSITIONING SYSTEM USING A DILUTION OF PRECISION METRIC

(75) Inventors: Farshid Alizadeh-Shabdiz, Wayland, MA (US); Mohammad A. Heidari, Worcester, MA (US)

(73) Assignee: Skyhook Wireless, Inc., Boston, MA (US)

(*) Notice: Subject to any disclaimer, the term of this patent is extended or adjusted under 35 U.S.C. 154(b) by 243 days.

This patent is subject to a terminal disclaimer.

(21) Appl. No.: 12/572,524

(22) Filed: Oct. 2, 2009

(65) Prior Publication Data

US 2011/0080317 A1      Apr. 7, 2011

(51) Int. Cl.
    *G01S 19/48*      (2010.01)
(52) U.S. Cl. .................................. 342/357.31
(58) Field of Classification Search ............. 342/357.31, 342/357.29
    See application file for complete search history.

(56) References Cited

U.S. PATENT DOCUMENTS

| | | |
|---|---|---|
| 4,876,550 A | 10/1989 | Kelly |
| 5,420,592 A | 5/1995 | Johnson |
| 5,936,572 A | 8/1999 | Loomis et al. |
| 5,943,606 A | 8/1999 | Kremm et al. |
| 5,999,124 A | 12/1999 | Sheynblat |
| 6,185,427 B1 | 2/2001 | Krasner et al. |
| 6,272,405 B1 | 8/2001 | Kubota et al. |
| 6,420,999 B1 | 7/2002 | Vayanos |
| 6,574,557 B2 | 6/2003 | Endo |
| 6,587,692 B1 | 7/2003 | Chen et al. |
| 6,678,611 B2 | 1/2004 | Khavakh et al. |
| 6,707,422 B2 | 3/2004 | Sheynblat et al. |
| 6,725,158 B1 | 4/2004 | Sullivan et al. |
| 6,771,211 B2 | 8/2004 | Syrjarinne et al. |
| 6,888,811 B2 | 5/2005 | Eaton et al. |
| 6,894,645 B1 | 5/2005 | Akopian et al. |
| 6,928,292 B2 | 8/2005 | Tsunehara et al. |

(Continued)

FOREIGN PATENT DOCUMENTS

WO     WO-2005/004527 A1     1/2005

(Continued)

OTHER PUBLICATIONS

Wikipedia, May 16, 2009, DOP table.*

(Continued)

*Primary Examiner* — Harry Liu
(74) *Attorney, Agent, or Firm* — Wilmer Cutler Pickering Hale and Dorr LLP

(57) ABSTRACT

The disclosed subject matter relates to a method for determining the position of a device in a hybrid positioning system. The method includes determining an initial position estimate of a device using a non-satellite positioning system, obtaining satellite measurements from less than four satellites, wherein the measurements include each satellite's position with respect to the initial position estimate, determining a dilution of precision (DOP) based on the satellite measurements, if the DOP is small, refining the initial position estimate using the satellite measurements, and if the DOP is large, providing the initial estimate as a final position estimate for the device. In some embodiments, the non-satellite positioning system is a WLAN positioning system. In some embodiments, the method includes obtaining satellite measurements from two satellites or three satellites.

21 Claims, 7 Drawing Sheets

GOOD SATELLITE GEOMETRY       BAD SATELLITE GEOMETRY

U.S. PATENT DOCUMENTS

| | | | |
|---|---|---|---|
| 6,975,266 B2 | 12/2005 | Abraham et al. |
| 6,978,023 B2 | 12/2005 | Dacosta |
| 7,120,449 B1 | 10/2006 | Muhonen et al. |
| 7,123,928 B2 | 10/2006 | Moeglein et al. |
| 7,130,646 B2 | 10/2006 | Wang |
| 7,151,939 B2 | 12/2006 | Sheynblat |
| 7,221,928 B2 | 5/2007 | Laird et al. |
| 7,236,126 B2 | 6/2007 | Jeon et al. |
| 7,250,907 B2 | 7/2007 | Krumm et al. |
| 7,254,405 B2 | 8/2007 | Lin et al. |
| 7,305,245 B2 | 12/2007 | Alizadeh-Shabdiz et al. |
| 7,313,402 B1 | 12/2007 | Rahman |
| 7,397,424 B2 | 7/2008 | Houri |
| 7,403,762 B2 | 7/2008 | Morgan et al. |
| 7,414,988 B2 | 8/2008 | Jones et al. |
| 7,433,694 B2 | 10/2008 | Morgan et al. |
| 7,471,954 B2 | 12/2008 | Brachet et al. |
| 7,474,897 B2 | 1/2009 | Morgan et al. |
| 7,479,922 B2 * | 1/2009 | Hunt et al. ............... 342/357.31 |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz et al. |
| 7,545,894 B2 | 6/2009 | Ziedan et al. |
| 7,551,579 B2 | 6/2009 | Alizadeh-Shabdiz et al. |
| 7,551,929 B2 | 6/2009 | Alizadeh-Shabdiz et al. |
| 7,587,081 B2 | 9/2009 | Rovira-Mas et al. |
| 7,595,754 B2 | 9/2009 | Mehta |
| 7,660,588 B2 | 2/2010 | Sheynblat et al. |
| 7,664,511 B2 | 2/2010 | Wang et al. |
| 7,683,835 B2 | 3/2010 | Sharma |
| 7,724,612 B2 | 5/2010 | Azim |
| 7,768,963 B2 | 8/2010 | Alizadeh-Shabdiz |
| 7,769,396 B2 | 8/2010 | Alizadeh-Shabdiz et al. |
| 7,818,017 B2 | 10/2010 | Alizadeh-Shabdiz et al. |
| 7,822,427 B1 | 10/2010 | Hou |
| 7,835,754 B2 | 11/2010 | Alizadeh-Shabdiz et al. |
| 7,848,733 B2 | 12/2010 | Bull et al. |
| 7,856,234 B2 | 12/2010 | Alizadeh-Shabdiz et al. |
| 8,130,148 B2 | 3/2012 | Alizadeh-Shabdiz |
| 2003/0011511 A1 | 1/2003 | King et al. |
| 2003/0125045 A1 | 7/2003 | Riley et al. |
| 2003/0197645 A1 | 10/2003 | Ninomiya et al. |
| 2003/0225893 A1 | 12/2003 | Roese et al. |
| 2004/0019679 A1 | 1/2004 | E et al. |
| 2004/0023669 A1 | 2/2004 | Reddy |
| 2004/0039520 A1 | 2/2004 | Khavakh et al. |
| 2004/0087317 A1 | 5/2004 | Caci |
| 2005/0017898 A1 | 1/2005 | Teranishi |
| 2005/0037775 A1 | 2/2005 | Moeglein et al. |
| 2005/0090266 A1 | 4/2005 | Sheynblat |
| 2005/0192024 A1 | 9/2005 | Sheynblat |
| 2005/0237967 A1 | 10/2005 | Lee et al. |
| 2005/0285783 A1 | 12/2005 | Harper |
| 2006/0009235 A1 | 1/2006 | Sheynblat et al. |
| 2006/0046709 A1 | 3/2006 | Krumm et al. |
| 2006/0049982 A1 | 3/2006 | Wells |
| 2006/0063560 A1 | 3/2006 | Herle |
| 2006/0089157 A1 | 4/2006 | Casey et al. |
| 2006/0089160 A1 | 4/2006 | Othmer |
| 2006/0170591 A1 | 8/2006 | Houri |
| 2006/0197704 A1 | 9/2006 | Luzzatto et al. |
| 2007/0004428 A1 | 1/2007 | Morgan et al. |
| 2007/0052583 A1 | 3/2007 | Zhodzishsky et al. |
| 2007/0109184 A1 | 5/2007 | Shyr et al. |
| 2007/0121560 A1 | 5/2007 | Edge |
| 2007/0126635 A1 | 6/2007 | Houri |
| 2007/0150516 A1 | 6/2007 | Morgan et al. |
| 2007/0167174 A1 | 7/2007 | Halcrow et al. |
| 2007/0217374 A1 | 9/2007 | Waxman |
| 2007/0244631 A1 | 10/2007 | Jung et al. |
| 2007/0258420 A1 | 11/2007 | Alizadeh-Shabdiz et al. |
| 2007/0268177 A1 | 11/2007 | Ahmed et al. |
| 2007/0286213 A1 | 12/2007 | Fodor et al. |
| 2007/0298761 A1 | 12/2007 | Bani Hani |
| 2008/0004888 A1 | 1/2008 | Davis et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008121 A1 | 1/2008 | Alizadeh-Shabdiz |
| 2008/0032706 A1 | 2/2008 | Sheynblat et al. |
| 2008/0033646 A1 | 2/2008 | Morgan et al. |
| 2008/0079633 A1 | 4/2008 | Pon et al. |
| 2008/0111737 A1 | 5/2008 | Haverkamp et al. |
| 2008/0137626 A1 | 6/2008 | Choi et al. |
| 2008/0158053 A1 | 7/2008 | Watanabe |
| 2008/0176583 A1 | 7/2008 | Brachet et al. |
| 2008/0214192 A1 | 9/2008 | Soliman |
| 2008/0234533 A1 | 9/2008 | Vollum |
| 2008/0248741 A1 | 10/2008 | Alizadeh-Shabdiz |
| 2008/0248808 A1 | 10/2008 | Alizadeh-Shabdiz |
| 2008/0261615 A1 | 10/2008 | Kalhan |
| 2009/0002237 A1 | 1/2009 | Nonoyama |
| 2009/0042557 A1 | 2/2009 | Vardi et al. |
| 2009/0075672 A1 | 3/2009 | Jones et al. |
| 2009/0103503 A1 | 4/2009 | Chhabra |
| 2009/0121927 A1 | 5/2009 | Moshfeghi |
| 2009/0149197 A1 | 6/2009 | Morgan et al. |
| 2009/0154371 A1 | 6/2009 | Alizadeh-Shabdiz et al. |
| 2009/0161806 A1 | 6/2009 | Ananny et al. |
| 2009/0168843 A1 * | 7/2009 | Waters et al. ................ 375/130 |
| 2009/0175189 A1 | 7/2009 | Alizadeh-Shabdiz et al. |
| 2009/0181695 A1 | 7/2009 | Wirola et al. |
| 2009/0187983 A1 | 7/2009 | Zerfos et al. |
| 2009/0189810 A1 | 7/2009 | Murray |
| 2009/0192709 A1 | 7/2009 | Yonker et al. |
| 2009/0196267 A1 | 8/2009 | Walker, Sr. |
| 2009/0231191 A1 | 9/2009 | Wu et al. |
| 2009/0251364 A1 | 10/2009 | Lorenz |
| 2009/0252138 A1 | 10/2009 | Alizadeh-Shabdiz et al. |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0039323 A1 | 2/2010 | Kosolobov et al. |
| 2010/0052983 A1 | 3/2010 | Alizadeh-Shabdiz |
| 2010/0195632 A1 | 8/2010 | Prabhu |
| 2010/0309051 A1 | 12/2010 | Moshfeghi |
| 2011/0012780 A1 | 1/2011 | Alizadeh-Shabdiz |
| 2011/0012784 A1 | 1/2011 | Alizadeh-Shabdiz |
| 2011/0021207 A1 | 1/2011 | Morgan et al. |
| 2011/0035420 A1 | 2/2011 | Alizadeh-Shabdiz et al. |
| 2011/0045840 A1 | 2/2011 | Alizadeh-Shabdiz et al. |
| 2011/0058495 A1 | 3/2011 | Alizadeh-Shabdiz et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0080841 A1 | 4/2011 | Alizadeh-Shabdiz et al. |
| 2011/0164522 A1 | 7/2011 | Alizadeh-Shabdiz et al. |
| 2011/0235532 A1 | 9/2011 | Alizadeh-Shabdiz et al. |
| 2011/0235623 A1 | 9/2011 | Alizadeh-Shabdiz et al. |
| 2011/0287783 A1 | 11/2011 | Alizadeh-Shabdiz et al. |
| 2011/0298660 A1 | 12/2011 | Alizadeh-Shabdiz |
| 2011/0298663 A1 | 12/2011 | Alizadeh-Shabdiz |
| 2011/0298664 A1 | 12/2011 | Alizadeh-Shabdiz |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2012/0007775 A1 | 1/2012 | Alizadeh-Shabdiz |

FOREIGN PATENT DOCUMENTS

| | | |
|---|---|---|
| WO | WO-2008/006077 A2 | 1/2008 |
| WO | WO-2009/149417 | 12/2009 |
| WO | WO-2010/005731 | 1/2010 |
| WO | WO-2011/008613 | 1/2011 |
| WO | WO-2011/041298 | 4/2011 |

OTHER PUBLICATIONS

Griswold, et al., "ActiveCamus—Sustaining Educational Communities through Mobile Technology," UCSD CSE Technical Report #CS200-0714, 2002, 19 pages.

Hazas, M., et al., "Location-Aware Computing Comes of Age," IEEE, vol. 37, Feb. 2004, 3 pages.

Hellebrandt, M. et al., "Estimating Position and Velocity of Mobile in a Cellular Radio Network," IEEE Transactions on Vehicular Technology, vol. 46, No. 1, Feb. 1997, 7 pages.

International Search Report and Written Opinion of the International Searching Authority for PCT/US2009/046504, mailed Oct. 7, 2009, 12 pages.

International Search Report and Written Opinion of the International Searching Authority of the United States Patent and Trademark Office for PCT/US2010/041282, mailing date of Aug. 30, 2010, 8 pages.

International Search Report and Written Opinion of the International Searching Authority, mailing date Aug. 18, 2009 for PCT/US09/047527, 10 pages.

International Search Report and Written Opinion of the International Searching Authority, the United States Patent and Trademark Office, for International Application No. PCT/US2010/050511, dated Dec. 30, 2010, 8 pages.

International Search Report and Written Opinion of the International Searching Authority, the United States Patent and Trademark Office, for International Application No. PCT/US2010/050742, dated Dec. 3, 2010, 9 pages.

Kim, M. et al., "Risks of Using AP Locations Discovered Through War Driving," Lecture Notes in Computer Science, vol. 3968, 2006, 15 pages.

Kirsner, S., "One More Way to Find Yourself," The Boston Globe, May 23, 2005, Retrieved from www.boston.com, 2 pages.

Krumm, J. et al., "LOCADIO: Interferring Motion and Location from Wi-Fi Signal Strengths," First Annual International Conference and Mobile and Ubiquitous Systems: Networking and Services, Aug. 2004, 17 pages.

Lamarca, A. et al., "Place Lab: Device Positioning Using Radio Beacons in the Wild," Intel Corporation, 2004, 20 pages.

Muthukrishnan, K. et al., "Towards Smart Surroundings: Enabling Techniques and Technologies for Localization," Lecture Notes in Computer Science, vol. 3479, May 2005, 11 pages.

International Search Report and Written Opinion of the International Search Authority, The United States Patent and Trademark Office, for International Application No. PCT/US2011/059139, dated Jan. 31, 2012, 12 pages.

* cited by examiner

FIG. 1A  GOOD SATELLITE GEOMETRY

FIG. 1B  BAD SATELLITE GEOMETRY

METHOD OF DETERMINING POSITION IN A HYBRID POSITIONING SYSTEM USING A DILUTION OF PRECISION METRIC

CROSS-REFERENCE TO RELATED APPLICATIONS

This application is related to the following references:

U.S. patent application Ser. No. 12/479,721, filed Jun. 5, 2009 and entitled "Systems and methods for Using Environmental Information in a Hybrid Positioning System;"

U.S. patent application Ser. No. 12/479,722, filed Jun. 5, 2009 and entitled "Systems and Methods for Maintaining Clock Bias Accuracy in a Hybrid Positioning System;"

U.S. patent application Ser. No. 12/479,723, filed Jun. 5, 2009 and entitled "System and Method for Refining a WLAN-PS Estimated Location Using Satellite Measurements in a Hybrid Positioning System;"

U.S. patent application Ser. No. 12/479,724, filed Jun. 5, 2009 and entitled "Systems and Methods for Determining Position Using a WLAN-PS Estimated Position as an Initial Position in a Hybrid Positioning System;"

U.S. patent application Ser. No. 12/479,727, filed Jun. 5, 2009 and entitled "Methods and Systems for Improving the Accuracy of Expected Error Estimation in a Hybrid Positioning System;"

U.S. patent application Ser. No. 12/479,729, filed Jun. 5, 2009 and entitled "Methods and Systems for Stationary User Detection in a Hybrid Positioning System;"

U.S. patent application Ser. No. 12/479,734, filed Jun. 5, 2009 and entitled "System and Method for Using a Satellite Positioning System to Filter WLAN Access Points in a Hybrid Positioning System;"

U.S. patent application Ser. No. 12/479,718, filed Jun. 5, 2009 and entitled "Method and System for Determining Location Using a Hybrid Satellite and WLAN Positioning System by Selecting the Best WLAN-PS Solution;"

U.S. patent application Ser. No. 12/485,588, filed Jun. 16, 2009 and entitled "Methods and Systems for Determining Location Using a Cellular and WLAN Positioning System by Selecting the Best WLAN PS Solution;"

U.S. patent application Ser. No. 12/485,591, filed Jun. 16, 2009 and entitled "Methods and Systems for Determining Location Using a Cellular and WLAN Positioning System by Selecting the Best Cellular Positioning System Solution;"

U.S. patent application Ser. No. 12/485,595, filed Jun. 16, 2009 and entitled "Methods and Systems for Improving the Accuracy of Expected Error Estimation in Location Determinations Using a Hybrid Cellular and WLAN Positioning System;"

U.S. patent application Ser. No. 12/504,373, filed Jul. 16, 2009 and entitled "Systems and Methods for Using a Satellite Positioning System to Detect Moved WLAN Access Points;"

U.S. patent application Ser. No. 12/504,379, filed Jul. 16, 2009 and entitled "Methods and Systems for Determining Location Using a Hybrid Satellite and WLAN Positioning System by Selecting the Best SPS Measurements;"

U.S. patent application Ser. No. 12/569,106, filed Sep. 29, 2009 and entitled "Improvement of the Accuracy and Performance of the Hybrid Positioning System;" and U.S. patent application Ser. No. 12/572,516, filed concurrently herewith and entitled 'Determining A Dilution of Precision Metric Using Two or Three GPS Satellites.'

BACKGROUND

1. Field

The present disclosure generally relates to hybrid positioning systems and more specifically, the assessment of the quality of a set of visible satellites to be used in a positioning system.

2. Description of Related Art

Positioning using radio signals has attracted increasing attention in the field of location and tracking. The initial research studies on satellite positioning systems (SPS) resulted in a very accurate Global Positioning System (GPS) which was initially used for military applications and later broadly used for commercial and personal applications. The availability of SPS-based positioning has been a major factor in the introduction of Location Based Services (LBS) in advanced mobile communication devices such as smartphones. By determining the position of the receiver, the system is able to provide more effective and more appropriate services to the user.

The Navstar Global Positioning System (GPS) operated by the US Government leverages about two-dozen orbiting satellites in medium-earth orbits as reference points. A user equipped with a GPS receiver can estimate his three-dimensional position (latitude, longitude, and altitude) anywhere at any time within several meters of the true location as long as the receiver can see enough of the sky to have four or more satellites "in view." Cellular carriers can use signals originating from and received at cell towers to determine a user's or a mobile device's location. Assisted GPS (AGPS) is another model that combines both GPS and cellular tower techniques to estimate the locations of mobile users who may be indoors and must cope with attenuation of GPS signals on account of sky blockage. In this model, the cellular network attempts to help a GPS receiver improve its signal reception by transmitting information about the satellite positions, their clock offsets, a precise estimate of the current time, and a rough location of the user based on the location of cell towers. No distinction is made in what follows between GPS and AGPS.

All positioning systems using satellites as reference points are referred to herein as Satellite-based Positioning System (SPS). While GPS is the only operational SPS at this writing, other systems are under development or in planning A Russian system called GLONASS and a European system called Galileo may become operational in the next few years. All such systems are referred to herein as SPS. GPS, GLONASS and Galileo are all based on the same basic idea of trilateration, i.e., estimating a position on the basis of measurements of ranges to the satellites whose positions are known. In each case, the satellites transmit the values of certain parameters which allow the receiver to compute the satellite position at a specific instant. The ranges to satellites from a receiver are measured in terms of the transit times of the signals. These range measurements can contain a common bias due to the lack of synchronization between the satellite and receiver (user device) clocks, and are referred to as pseudoranges. The lack of synchronization between the satellite clock and the receiver (user device) clock can result in a difference between the receiver clock and the satellite clock, which is referred to as internal SPS receiver clock bias or receiver clock bias, here. In order to estimate a three dimensional position there is a need for four satellites to estimate receiver clock bias along with three dimensional measurements. Additional measurements from each satellite correspond to pseudorange rates in the form of Doppler frequency. References below to raw SPS measurements are intended generally to mean pseudoranges and Doppler frequency measurements. References to SPS data are intended generally to mean data broadcast by the satellites. References to an SPS equation are intended to mean a mathematical equation relating the measurements and data from a satellite to the position and velocity of an SPS receiver.

WLAN-based positioning is a technology which uses WLAN access points to determine the location of mobile users. Metro-wide WLAN-based positioning systems have been explored by several research labs. The most important research efforts in this area have been conducted by the PlaceLab (www.placelab.com, a project sponsored by Microsoft and Intel); the University of California, San Diego ActiveCampus project (ActiveCampus—Sustaining Educational Communities through Mobile Technology, technical report #CS2002-0714); and the MIT campus-wide location system. There is only one commercial metropolitan WLAN-based positioning system in the market at the time of this writing, and it is referred to herein as the WPS (WiFi positioning system) product of Skyhook Wireless, Inc (www.skyhookwireless.com).

SPS is based on triangulation (trilateration) using multiple distance measurements from multiple satellites. The receiver measures its distance from at least four satellites. Based on the distance measurements, the receiver solves a set of quadratic equations including $(x_r, y_r, z_r)$, coordinates of the receiver, and $\tau_r$, receiver clock bias. In order to quantify the accuracy of the location estimate (quality of estimate of the reported location,) SPS systems use several metrics such as Dilution of Precision ($DOP_0$) (Indices, like index 0, are used to differentiate different DOP definitions here). Widely used in literature, the geometry of the set of visible satellites, indicated by $DOP_0$ metric, is assumed to have correlation with estimated location error. In other words, $DOP_0$ relates the geometry of the satellites to the quality of the location estimate.

Different $DOP_0$ metrics and values, such as Horizontal Dilution of Precision (HDOP) or Position Dilution of Precision (PDOP)), have been used in the last two decades to decide on the quality of a set of satellites used for positioning. A set of satellites can be considered for positioning if its resulted $DOP_0$ metric is below a threshold. Note that $DOP_0$ metric can be measured differently with different scales, but its importance is to provide a means to assess the quality of the set of visible satellites.

For example, if all the satellites are exactly above the location of the receiver or very close to one another that set of satellites cannot be used for positioning. Geometrically, satellites should be spread apart in the sky. The best condition is one satellite above the receiver and others evenly distributed in the sky with good visibility by the receiver. In best scenarios, if all the satellites have angle of 60 degrees to one another, that geometry of satellites can provide more accurate results for positioning. Angles of less than 30 degrees result in satellites which are either close to one another or aligned on the same line that connects them to the receiver. Very wide angles such as 150 degrees also provide satellites which are very far from one another and hence they can only be visible from the horizon with respect to a GPS receiver. Such cases provide bad geometry for satellite positioning. Satellites in the proximity of other satellites and/or satellites aligned on the same plane (i.e. forming a coplanar problem) are normally not useful in location determination as they provide redundant information about receiver. For example, two satellites which are close to one another provide the same range estimation to the receiver and hence one of range estimations can be ignored. Similarly, when satellites are aligned in such a way that the plane which passes through them also passes through the receiver location (or close by locations) the range estimation from the satellites to the receiver are not independent and become redundant. In both cases, the algorithm which solves the range estimation equations to find the receiver location will fail (or converge very slowly) as its input includes redundant data.

The term $DOP_0$ only applies to the cases where the receiver can see four or more satellites as described below. With fewer satellites, it is mathematically impossible to obtain a $DOP_0$ value when traditional methods are used.

The traditional method of obtaining all $DOP_0$ metrics is to use the estimated location of receiver, $(x_r, y_r, z_r)$, and each of the visible satellites (four or more), $(x_{s_i}, y_{s_i}, z_{s_i})$, where i indicates the index of the visible satellite. The SPS system forms a geometry matrix $$G = \begin{bmatrix} \Delta x_1 & \Delta y_1 & \Delta z_1 & -1 \\ \vdots & \vdots & \vdots & \vdots \\ \Delta x_n & \Delta y_n & \Delta z_n & -1 \end{bmatrix}$$

where each $\Delta$ component can be determined as follows, $$\Delta x_i = \frac{x_r - x_{s_i}}{R_i}$$

$$\Delta y_i = \frac{y_r - y_{s_i}}{R_i}$$

$$\Delta z_i = \frac{z_r - z_{s_i}}{R_i}$$

where $R_i$ is the estimated range between the estimated receiver location and i the satellite.

It should be noted that matrix G has dimension n×4, where n represents the number of visible satellites. The next step to determine the $DOP_0$ values is to form another matrix $H=G^T \times G$ with dimensionality of 4×4 ($T$ represents transpose of a matrix). The inverse of matrix H, denoted by $H^{-1}$, is used to determine the DOP values. The diagonal elements of $H^{-1}$ are used to form Position Dilution of Precision (PDOP) and Time Dilution of Precision (TDOP). Other $DOP_0$ values, such as HDOP or Vertical Dilution of Precision (VDOP), are computed similarly.

The mathematical representation of $DOP_0$ values can be related to the geometry of the set of satellites. In principle, a good set of satellites for SPS is a set of satellites that are well-spread in the sky. Very close satellites or coplanar satellites provide very little information about the receiver's position. FIG. 1 illustrates a good set of satellites versus a bad set of satellites. Relating the geometry of satellites to $DOP_0$ values, we can conclude that a good set of satellites results in smaller $DOP_0$ values and a bad set of satellites results in large $DOP_0$ values. Therefore, it is very instructive and significant to obtain $DOP_0$ values for a specific set of satellites relative to an estimated receiver location. The positioning system, in our case an integrated WLAN-PS and SPS environment, can effectively decide if a set of satellites is usable for positioning or if it has a bad geometry and will produce large location error. The $DOP_0$ value is directly related to the volume of the tetrahedron formed using each satellite as an end point of the tetrahedron (in case of four satellites) or similar shapes (in case of more than four satellites) formed by the satellites.

As can be seen from the equations, the smallest number of satellites to form an invertible H matrix is four. In SPS, fewer than four satellites results in $H_{4 \times 4}$ with dependent rows and consequently $H^{-1}$ does not exist. This fact poses a problem for hybrid positioning schemes with fewer than four visible satellites. The goal is for a positioning scheme to assess the quality of a set of visible satellites. What is needed is a metric to relate the geometry of the visible satellites to quality of the set of visible satellites and to improve the quality of the estimate of the receiver's location when fewer than four satellites are present.

SUMMARY

The present application relates to a method for determining the position of a device in a hybrid positioning system. The method includes determining an initial position estimate of a device using a non-satellite positioning system, obtaining satellite measurements from less than four satellites, wherein the measurements include each satellite's position with respect to the initial position estimate, determining a dilution of precision (DOP) based on the satellite measurements, if the DOP is small, refining the initial position estimate using the satellite measurements, and if the DOP is large, providing the initial estimate as a final position estimate for the device.

In some embodiments, the non-satellite positioning system is a WLAN positioning system. In some embodiments, the method includes obtaining satellite measurements from two satellites or three satellites. In some embodiments, the DOP is related to the angle between the two satellites with respect to the initial position estimate. In some embodiments, the method includes obtaining satellite measurements from three satellites. In some embodiments, the method includes grouping the three satellites into three groups of two satellites, determining an angle between each of the two satellites with respect to the initial position determination for each group, and selecting two or more satellites from the group of three satellites based on the angles measured, wherein satellites having large angles between them are selected and satellites having small angles in between them are not selected. In some embodiments, the DOP is related to an aggregate of the angles between each pair of three satellites with respect to the initial position estimate.

In some embodiments, a large DOP corresponds to satellites that display poor geometry in reference to the location of the device and a large value of DOP can be 3.0. In some embodiments, a small DOP corresponds to satellites that display good geometry in reference to the location of the device and a small value of DOP can be a value between about 1.4 to about 2.5. In some embodiments, the initial position estimate is refined when the DOP is smaller than 1.65. In some embodiments, the hybrid positioning system constructs a satellite vector corresponding to a vector from the initial position to each satellite. In some embodiments, the DOP of a set of two satellites is determined using the dot product of the satellite position vectors for each satellite, wherein a small value of DOP comprises a value between 0 and 0.85 and a large value of DOP comprises a value greater than or equal to 0.86.

Another aspect of the present disclosure relates to a method for determining position of a device in a hybrid positioning system. The method can include determining an initial position estimate of a device using a non-satellite positioning system, obtaining satellite measurements from three satellites, wherein the measurements include each satellite's position with respect to the initial position estimate, grouping the three satellites into three groups of two satellites, determining an angle between each of the two satellites with respect to the initial position determination for each group, and selecting two or more satellites from the group of three satellites based on the angles measured, wherein satellites having large angles between them are selected and satellites having small angles in between them are not selected. In some embodiments, the DOP is related to an aggregate of the angles between each pair of three satellites with respect to the initial position estimate. In some embodiments, the hybrid positioning system constructs a satellite vector corresponding to the vector from the initial position to each satellite. In some embodiments, the angle between each of the two satellites with respect to the initial position determination is the DOP for each group. In some embodiments, the non-satellite positioning system is a WLAN positioning system.

In one aspect, the disclosed subject matter relates to a method for determining position of a device in a hybrid positioning system. In some embodiments, the method includes determining an initial position estimate of a device using a non-satellite positioning system, obtaining satellite measurements from three satellites, wherein the measurements include each satellite's position with respect to the initial position estimate, grouping the three satellites into three groups of two satellites, determining an angle between each of the two satellites with respect to the initial position determination for each group, wherein the angle is the DOP for each group; determining three intermediate positions for the device using each group of two satellites; weighting the three intermediate positions for the device using the DOP for each group of two satellites; and determining a final position of the device by averaging the weighted intermediated positions. In some embodiments, the non-satellite positioning system is a WLAN positioning system.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION

The present disclosure describes a new technique for a positioning system, which uses an initial estimated location (IEL) from a WLAN positioning system and SPS satellite information to assess the quality of set of SPS measurements or individual satellites to be used in a position determination. The present disclosure also relates to evaluating the quality of set of satellite positioning system (SPS) measurements and to improving the quality of SPS location estimation by accepting/rejecting satellite information. This system can be used when the receiver sees less than four satellites, for example, two or three satellites. Specifically, the disclosure describes a new method used to evaluate the dilution of precision (DOP) metric, when less than four satellites are visible.

The embodiments also utilize the geometry of visible satellites to decide if the current set of visible satellites (either two or three satellites) are appropriate to be used for positioning and consequently to improve the overall quality of estimate of the predicted location reported by positioning system.

In order to do so, the method relates the geometry of the visible satellites to the predicted location of the receiver when only two or three satellites are visible. Note that the phrase "geometry of satellites" is used to describe the geometry of visible satellite with respect to the estimated receiver location throughout this disclosure. As discussed above, the DOP metric is a well-known metric in satellite positioning and is used to assess the quality of set of satellites that are used for location determination. In this disclosure, a method is described to assess the quality of set of satellites when the set has only two or three satellites and an initial position of the device.

The provided technique in the embodiments can improve the quality of the estimated location in an integrated WLAN-PS and SPS environment. In such hybrid positioning systems, the final reported location can be one of the following;
1) WLAN-PS reported location along with its quality of estimate
2) SPS reported location in scenarios with four or more visible satellites along with its quality of estimate or
3) A combination of WLAN-PS and SPS reported locations.

Figure 1:
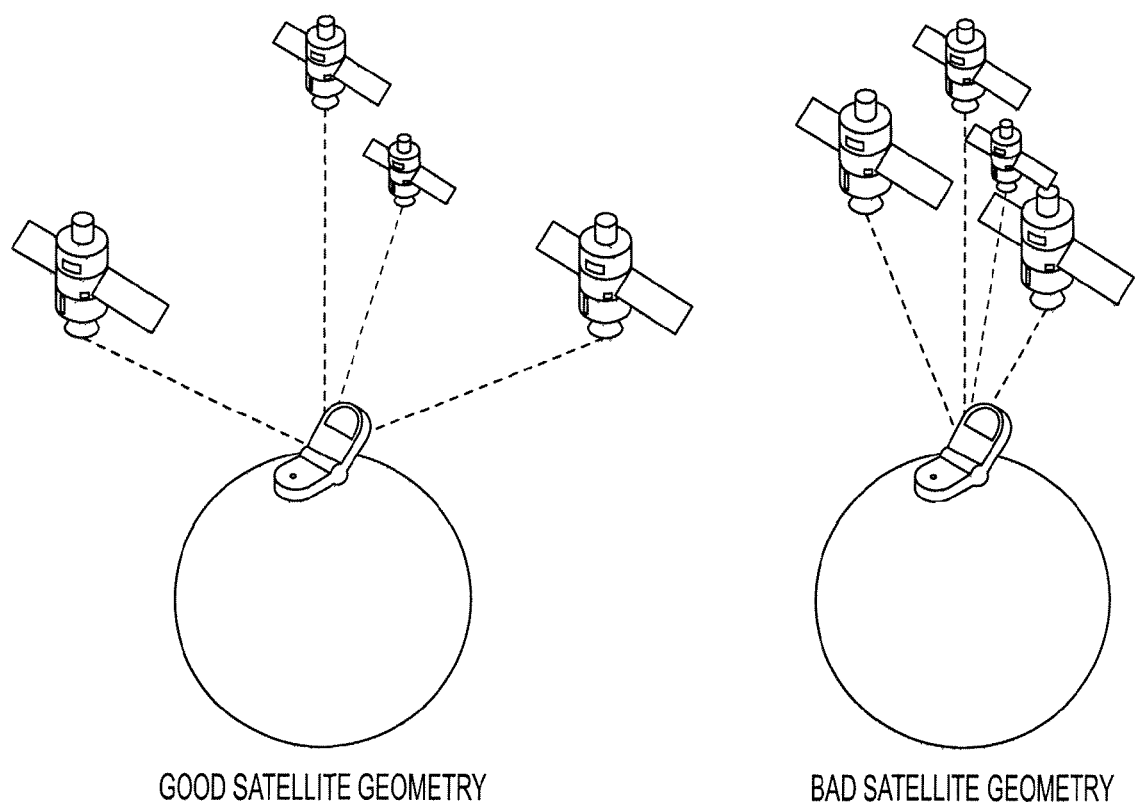
FIG. 1A illustrates a configuration of satellites that provides an accurate position determination, according to an embodiment of the present disclosure.
FIG. 1B illustrates a configuration of satellites that provides an inaccurate position determination, according to an embodiment of the present disclosure.

The quality of estimate metric in the latter case should consider the aggregate measurements from both WiFi access points and satellites' range information and range position information. Generally, the quality of estimate in an integrated WLAN-PS and SPS environments can include a combination of the quality of the WLAN-PS reported location and the dilution of precision ($DOP_0$) of SPS when satellites are in range and their position information is available. Referring to FIG. 1, one can observe good satellite geometry for SPS where satellites are spread in sky (shown in FIG. 1A) versus bad satellite geometry (shown in FIG. 1B) where satellites are in close proximity of each other.

Traditional $DOP_0$ metrics are obtained from the locations of four or more visible satellites at any specific time and location. According to the location of the visible set of satellites and predicted location of the receiver, we form a geometry matrix, denoted by G, including the unit vectors connecting the receiver location to position of each satellite. The clock bias is included by appending −1 at the end of each vector.

Each row in the geometry matrix then includes of four elements.

$$G = \begin{bmatrix} \Delta x_1 & \Delta y_1 & \Delta z_1 & -1 \\ \vdots & \vdots & \vdots & \vdots \\ \Delta x_n & \Delta y_n & \Delta z_n & -1 \end{bmatrix}$$

Traditional DOP metrics are obtained by inversion of the $H = G^T \times G$ where $^T$ represents transpose function. With n visible satellites, the dimension of H is 4×4 with rank n=4. The inversion of this matrix results in another 4×4 matrix whose diagonal elements can be used to determine different $DOP_0$ metrics. However, when fewer than four satellites are visible, the dimension of matrix H is 4×4 with rank n<4, i.e. H is rank-deficient. This results in a non-invertible H matrix and hence the $DOP_0$ values cannot be obtained because there are not enough measurements to create the appropriate matrix.

SPS uses at least four satellites to estimate the inaccuracies of estimated receiver location. These inaccuracies include x,y,z coordinate inaccuracies as well as receiver clock time inaccuracies. If one of the parameters is estimated perfectly and does not have any inaccuracy it can be effectively excluded from the DOP estimation and a fewer number of satellites would be required to solve for receiver location and DOP calculation. In the case of hybrid positioning systems, prior knowledge of the receiver location can indicate if the system was able to estimate the clock bias correctly and hence clock bias inaccuracies do not exist. This leads us to disregard the time variations in G and disregard the last column consisting of −1.

This disclosure describes a method to provide a DOP metric, referred to as $DOP_2$, for the cases where only two satellites are visible to the receiver. In such cases, it also provides a means for accepting or rejecting a set of satellites to be used in a positioning system. Note that $DOP_2$ has different scale compared to traditional $DOP_0$ metric but it behaves similarly. Smaller values of $DOP_2$ indicate good satellite geometry and larger values of $DOP_2$ indicate bad satellite geometry.

The disclosure then describes three different approaches to determine another DOP metric, referred to as $DOP_3$, for cases where only three satellites are visible to the receiver. For such cases, the invention describes a satellite selection method. This method also can be used to accept/reject the entire set of satellites to be used in a positioning system. Similar to the $DOP_2$ metric, the $DOP_3$ metric provides a means to indicate if geometry of satellite is usable for a positioning system.

Case I: Two Satellites

First, the embodiment using two satellites will be described. In this embodiment, it is assumed (1) the hybrid positioning system, for example as WLAN Positioning System (WLAN-PS), has an estimate of the receiver location which is referred to as initial estimated location (IEL), (2) there exist two visible satellites in the range of receiver's location device and (3) SPS is able to obtain range estimates and satellite information from these two satellites. The following method is used to determine whether or not the hybrid positioning system will use the satellite measurements for the final location determination. If, through the following method, it is determined that the satellites will provide accurate position measurements, then the satellites can be used in conjunction with the WLAN positioning system to determine the position of a device. However, if it is determined that the detected satellites are in such a configuration that they would provide inaccurate measurements, i.e., the satellites have a poor geometry with respect to each other, the satellite data can be ignored and the position determination can be made solely using the WLAN positioning system information.

In this embodiment, the geometry of only two satellites is related to the quality of the set of satellites. The defined metric, describing the quality of set of satellites, can be used to improve the estimated location using an aggregate of WiFi access points and satellites measurements. This provides a means to obtain a DOP-like metric, referred to herein as $DOP_2$, for the cases where only two satellites are visible to the receiver. If the DOP-like metric indicates a favorable satellite geometry, the range measurements from satellites can be used to both provide a better location estimation and to improve the overall quality of estimate of the receiver location reported by the positioning system (i.e. positioning system can be a hybrid positioning system which can refine the IEL by employing the range measurements from visible satellites). However, if the DOP-like metric indicates unfavorable satellite geometry, the satellite measurements can be discarded.

The position information of the satellites can be related to the quality of that set of satellites to be used in positioning system when only two satellites are visible by the receiver. In such cases, the system then has to decide if satellites are close to one another with respect to IEL. In the case of only two visible satellites, a good metric to measure the quality of the set of the satellites is the angle of the two satellites with respect to IEL. The $DOP_2$ metric, in case of two satellites, can be related to the angle between the satellites with respect to the initial estimated location.

Figure 2:
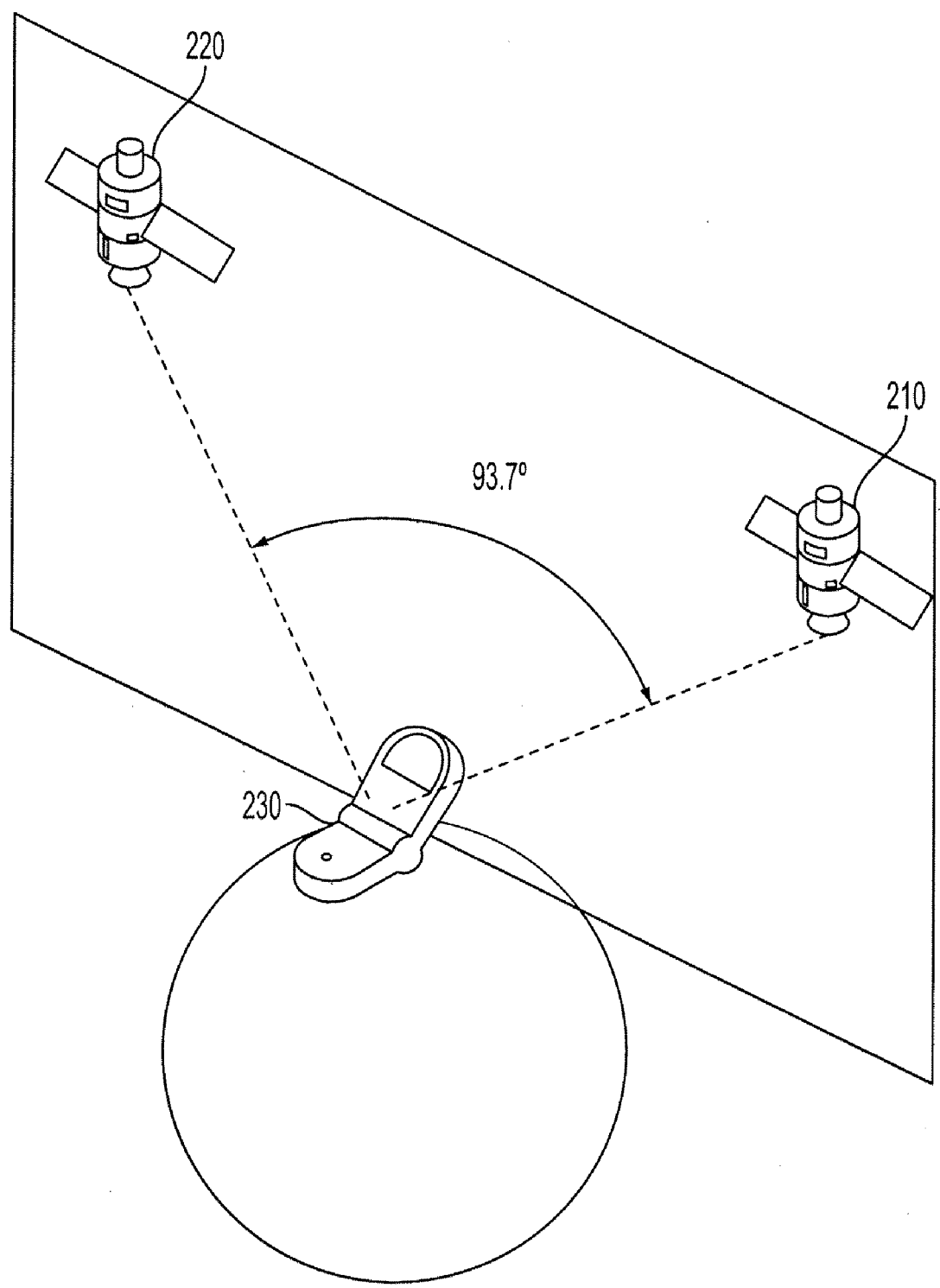
FIG. 2 illustrates the spread of two satellites with respect to a receiver's location in a plane defined by the two satellites and the receiver's location, according to an embodiment of the present disclosure.
Figure 3:
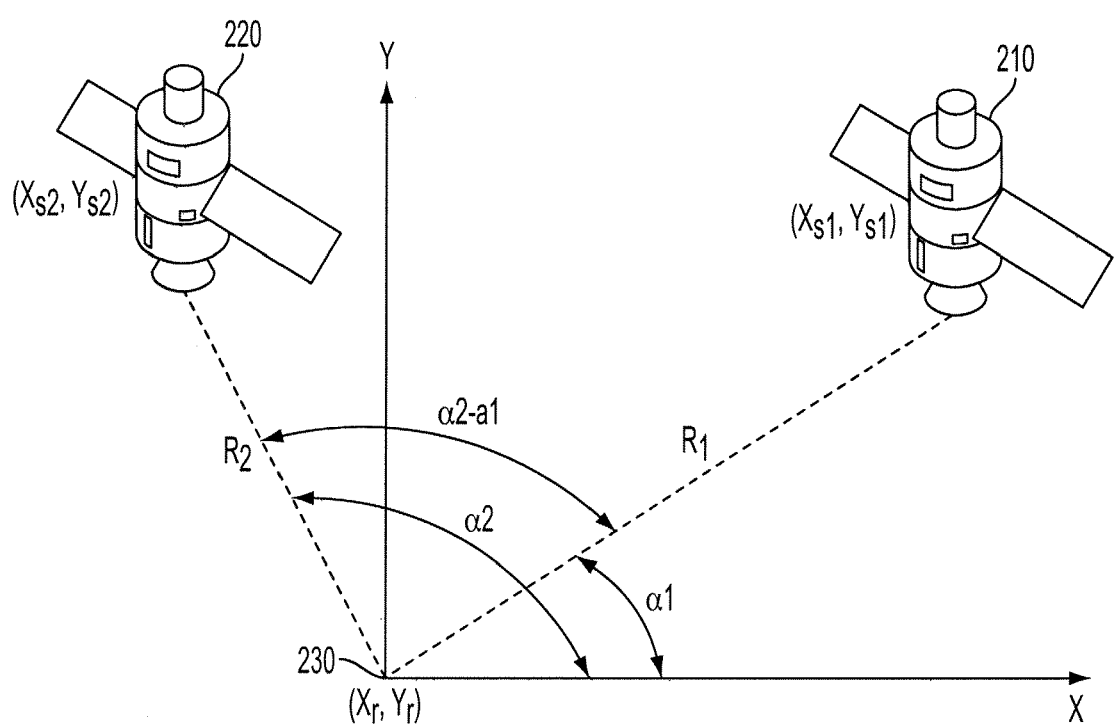
FIG. 3 illustrates the example of FIG. 2 in a two dimensional plane and the respective angles, according to an embodiment of the present disclosure.

As can be seen from FIG. 2, a first satellite 210, a second satellite 220 and the IEL of receiver 230 (total of three points in 3D space) define one plane 240. Thus, it is possible to obtain the angle 250 between the satellites 210, 220 in normal XYZ coordinates. However, it is not essential and the angle between the satellites with respect to IEL can easily be obtained following the described procedure. Rotating the plane containing the two satellites and the IEL as illustrated in FIG. 2 will result in what is shown in FIG. 3 and we will continue with notation of FIG. 3. The rotation of the plane reduces a 3-D problem to a 2-D problem and hence reduces variables and numbers used for the calculation.

The disclosed method uses the unit vectors connecting the IEL to each satellite and measures the angle between the satellites. Note that the phrase "angle between two satellites" refers to the measure of an angle between the satellites with respect to the IEL. The hybrid positioning system had previously determined the IEL using a WLAN positioning system. The hybrid positioning system then utilizes the satellite information from each of the two visible satellites. The satellite information contains the XYZ position of each satellite and hence the positioning system can find the distance between the IEL and each satellite and then form the unit vector connecting the IEL to satellite position.

If we assume that we have two satellites 210, 220 in a 2D plane, we can use a similar $DOP_2$ metric and find if the satellites are well distributed.

In 2D case, referring to FIG. 3, we have $$\Delta x_1 = \frac{x_r - x_{s_1}}{R_1} = \cos(\alpha_1) \; \Delta x_2 = \frac{x_r - x_{s_2}}{R_2} = \cos(\alpha_2) \text{ and}$$

$$\Delta y_1 = \frac{y_r - y_{s_1}}{R_1} = \sin(\alpha_1) \; \Delta y_2 = \frac{y_r - y_{s_2}}{R_2} = \sin(\alpha_2)$$

where $(x_r, y_r)$ represent the receiver location in 2D plane, $(x_{s_i}, y_{s_i})$ represent the ith satellite position in the 2D plane, $x_1$ represents the angle between the x-axis and the first satellite 210, and $x_2$ represents the angle between the x-axis and the second satellite 220.

Forming the G matrix, also referred to as the geometry matrix, and disregarding the time variations, we have $$G = \begin{bmatrix} \Delta x_1 & \Delta y_1 \\ \Delta x_2 & \Delta y_2 \end{bmatrix} = \begin{bmatrix} \cos(\alpha_1) & \sin(\alpha_1) \\ \cos(\alpha_2) & \sin(\alpha_2) \end{bmatrix}$$

Forming the H matrix from the G matrix, we have $$H = G^T \times G = \begin{bmatrix} \cos(\alpha_1) & \cos(\alpha_2) \\ \sin(\alpha_1) & \sin(\alpha_2) \end{bmatrix} \times \begin{bmatrix} \cos(\alpha_1) & \sin(\alpha_1) \\ \cos(\alpha_2) & \sin(\alpha_2) \end{bmatrix}$$

In order to find the inverse of H matrix, we can start with finding the determinant of H, i.e. $|H|=\sin^2(\alpha_1-\alpha_2)$.

Therefore, $H^{-1}$ is computed as $$H^{-1} = \frac{1}{|H|} \begin{bmatrix} \sin^2(\alpha_1) + \sin^2(\alpha_2) & -\cos(\alpha_1)\sin(\alpha_1) + \cos(\alpha_2)\sin(\alpha_2) \\ -\cos(\alpha_1)\sin(\alpha_1) + \cos(\alpha_2)\sin(\alpha_2) & \cos^2(\alpha_1) + \cos^2(\alpha_2) \end{bmatrix}$$

By definition, the $DOP_2$ value can be extracted as $DOP_2 = \sqrt{H_{11}^{-1} + H_{22}^{-1}}$ which is $$DOP_2 = \sqrt{\frac{1}{|H|}(\cos^2(\alpha_1) + \cos^2(\alpha_2) + \sin^2(\alpha_1) + \sin^2(\alpha_2))} = \sqrt{\frac{2}{\sin^2(\alpha_1 - \alpha_2)}} = \frac{\sqrt{2}}{|\sin(\alpha_1 - \alpha_2)|}$$

If the angle between the satellites, $\theta = \alpha_1 - \alpha_2$, is small, $|\sin(\theta)|$ is small and $DOP_2$ is large. Large values of $DOP_2$ demonstrate poor satellite geometry (i.e. satellites are close to one another or are collinear) and small values of $DOP_2$ indicate good satellite geometry.

From the 2D case, it can be observed that the best case for two satellites to provide position information is for them to have angle of $$\alpha_1 - \alpha_2 = \frac{\pi}{2} = 90°.$$

This results in $DOP_2 = \sqrt{2}$, which is the minimum for $DOP_2$. Values of $DOP_2$ in the range of 1.4 to about 2.5, preferably about 1.65, indicate good satellite geometry and therefore indicate a reliable set of satellites for positioning purposes. $DOP_2$ values that are above 3.0 indicate are too high and indicate a set of satellites with poor geometry. Therefore, a set of satellites with a $DOP_2$ greater than 3.0 are unreliable for positioning purposes.

By choosing a threshold angle, $\gamma°$, we can conclude that if angle between satellites, $\theta$, fulfills the following conditions, then the set of satellites can effectively be used for positioning.

$$\theta > \gamma°$$

$$\theta < \pi - \gamma°$$

Alternatively, we can summarize the above equations as $\gamma° < \theta < \pi - \gamma°$. We can instead define the range of possible angles as $\Theta = [\gamma°, \pi - \gamma°]$ and if $\theta \in \Theta$ we can use the set of satellites for positioning. For example, if the angle between the satellites is less than 30 degrees, those satellites will not result in a reliable position determination. However, if the angle between the satellites is greater than 30 degrees, those satellites can result in a reliable position determination and should be used. The angles between two satellites which are in the range of 30 degrees and 150 degrees are preferred for hybrid positioning while the angles outside of this range usually provide bad geometry for satellites in order to be used for hybrid positioning.

If the angle between the two satellites satisfies the above threshold, the set of satellites can be used to obtain a better location and to improve the quality of estimate of the reported location. Otherwise, the satellites are too close to one another and their distance measurements are not completely uncorrelated and hence can not be used for positioning receiver's location. Mathematically, $$\text{ANGLE}(S_1, S_2) = \cos^{-1}(v_1 \cdot v_2)$$

where $v_1 = (\Delta x_1, \Delta y_1, \Delta z_1)$ and $v_2 = (\Delta x_2, \Delta y_2, \Delta z_2)$ are unit vectors from predicted location of the receiver to satellites $S_1$ and $S_2$ and $(\cdot)$ represents the dot product. If vectors $v_1$ and $v_2$ are not normalized, the angle can be represented as $$\text{ANGLE}(S_1, S_2) = \cos^{-1}\left(\frac{v_1 \cdot v_2}{\|v_1\| \|v_2\|}\right)$$

More formally, if $$\Delta x_i = \frac{x_r - x_{S_i}}{R_i}$$

$$\Delta y_i = \frac{y_r - y_{S_i}}{R_i}$$

$$\Delta z_i = \frac{z_r - z_{S_i}}{R_i}$$

$$R_i = \sqrt{(x_r - x_{S_i})^2 + (y_r - y_{S_i})^2 + (z_r - z_{S_i})^2}$$

$$v_1 = (\Delta x_1, \Delta y_1, \Delta z_1)$$

$$v_2 = (\Delta x_2, \Delta y_2, \Delta z_2)$$

$$v_1 \cdot v_2 = \Delta x_1 \Delta x_2 + \Delta y_1 \Delta y_2 + \Delta z_1 \Delta z_2$$

As we defined in the 2D case, $$DOP_2 = \frac{\sqrt{2}}{\sin(\angle(S_1, S_2))} = \frac{\sqrt{2}}{\sin(\cos^{-1}(v_1 \cdot v_2))} = \frac{\sqrt{2}}{\sqrt{1 - (v_1 \cdot v_2)^2}} = \sqrt{\frac{2}{1 - (v_1 \cdot v_2)^2}}$$

We compare $DOP_2$ to a fixed threshold to declare if the set of satellites are usable for positioning.

For the example of integrated WLAN-PS and SPS environment, it can be decided that two very close satellites (as measured by the angle-between-satellites sense) are not likely to provide sufficient information for hybrid positioning system. One example for angle threshold, $\gamma_1°$, can be considered to be around 30°. Mathematically, the process can be represented as following:

The $DOP_2$ threshold can be determined by $$\varphi_1 = \frac{\sqrt{2}}{\sin(\gamma_1°)}.$$

$|DOP_2| > \varphi_1 \Rightarrow \text{ANGLE}(S_1, S_2) \notin \Theta$ then set of satellites can not be used for positioning. On the other hand, $|DOP_2| \leq \varphi_1 \Rightarrow \text{ANGLE}(S_1, S_2) \in \Theta$ and set of satellites can be used for positioning.

Figure 4:
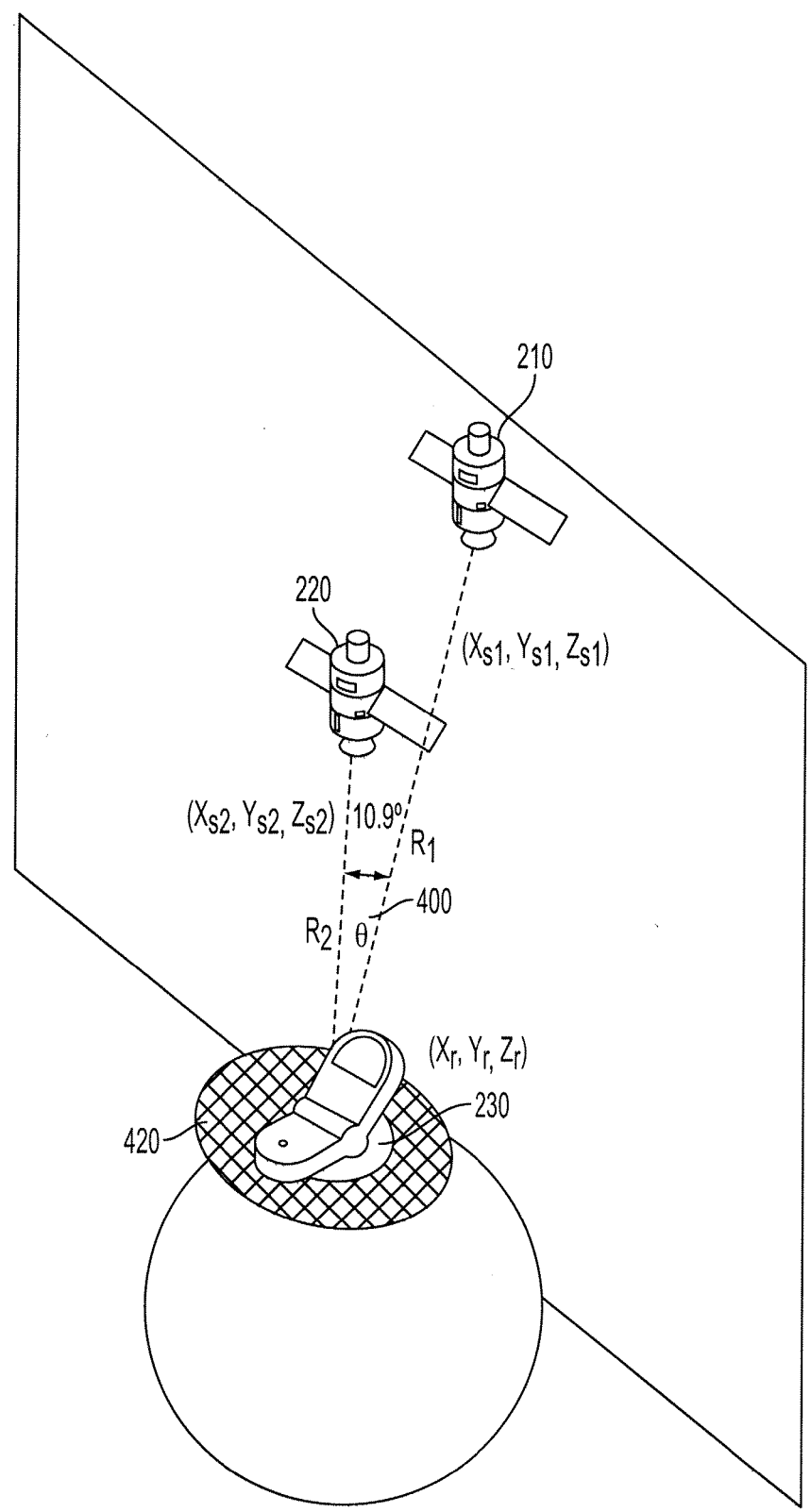
FIG. 4 illustrates poor satellite geometry with two satellites and shows a large region in which receiver could be located, according to an embodiment of the present disclosure.

This method also provides a means for satellite selection in a hybrid positioning system. It allows the hybrid positioning system to either reject the current set of visible satellites, i.e. only uses WLAN-PS reported location, or accept the satellite information and range measurements to be used for hybrid positioning. If two satellites are relatively close to one another, their angle is not in $\Theta$, their range measurements will most likely provide a very large region in which the receiver could be located. Consequently, the location accuracy decreases, as receiver could be anywhere in the region. The concept is depicted in FIG. 4. FIG. 4 depicts two satellites 210, 220 with a small angle 400 between them, and a large location region 420. In such cases, hybrid positioning system would choose not to use the satellite information and would rely solely on the WLAN positioning information.

Possible Modifications and Variations

For practical implementations, it may be best to compare the results of vector manipulation to a fixed threshold to determine on the $DOP_2$ value. Note that $DOP_2$ is only function of the angle between the satellites and hence it is only necessary to obtain some information about that angle. It is computationally more efficient to use only the relative positions of the satellites (with respect to initial location) and calculate the $DOP_2$ metric (as opposed to calculating the angle between the satellites from the same vectors and then calculating the $DOP_2$ metric based on that angle). For example, the dot product between two normalized vectors represents the cosine value of the angle of those two vectors. Here we propose to compute the dot product of the normalized vectors instead of finding the dot product and then finding the angle from the result of the dot product. This will result in computationally more efficient algorithm to find information regarding the angle between the satellites.

We can define the following as an alternate $DOP_2$ value: $\hat{DOP}_2 = v_1 \cdot v_2$ for the case when vectors $v_1$ and $v_2$ are normalized or $$\hat{DOP}_2 = \frac{v_1 \cdot v_2}{\|v_1\| \|v_2\|} = \text{ANGLE}(S_1, S_2)$$

when they are not normalized.

We can compare it directly to another threshold to decide if the set of satellites is usable for positioning.

For example, if we decide to use the 30° degree value and reject satellites whose angles with respect to each other is less than 30°, we can find $$\varphi_2 = \cos\left(\frac{30 \times \pi}{180}\right) = 0.866,$$

where $\phi_2$ is the new threshold. We applied $\phi_1$ when we used equation in [0049] to determine if two satellites are close. We apply $\phi_2$ when we use equation in [0054] to determine if satellites are close. In other words, instead of performing an additional step (calculating the angle between the satellites)

and comparing the results to $\phi_1$, we compare the product of the vectors to another threshold, $\phi_2$. We then compare $\hat{DOP}_2$ to $\phi_2$. The process can be summarized as following:

Similar to the procedure described above the new $DOP_2$, $\hat{DOP}_2$, can be compared to its threshold, $\phi_2$, to determine if the current set of two satellites can be used for positioning. $|\hat{DOP}_2|>\phi_2 \Rightarrow ANGLE(S_1,S_2) \notin \Theta$ and set of satellites can not be used for positioning. On the other hand $|\hat{DOP}_2| \leq \phi_2 \Rightarrow ANGLE(S_1,S_2) \in \Theta$ and set of satellites can be used for positioning. The equations signify that if the calculated $\hat{DOP}_2$ is greater that its threshold, $\phi_2$, the angle between two satellites is smaller than angle threshold, $\gamma_1°$, and consequently the set of two satellites cannot be used for positioning. On the other hand, if the calculated value of $\hat{DOP}_2$ is smaller than $\phi_2$, then angle between two satellites is larger than its threshold and the set can be used for positioning.

Note that value of $\phi_1$ is different from $\phi_2$, but they are related to one another by $$\frac{2}{\varphi_1^2} + \varphi_2^2 = 1.$$

Calculating $\hat{DOP}_2$ and comparing it with $\phi_2$ is more computationally efficient and less time consuming for selecting the best satellites and/or determine if a set of two satellites can be used for positioning.

Case II: Three Satellites

Figure 5:
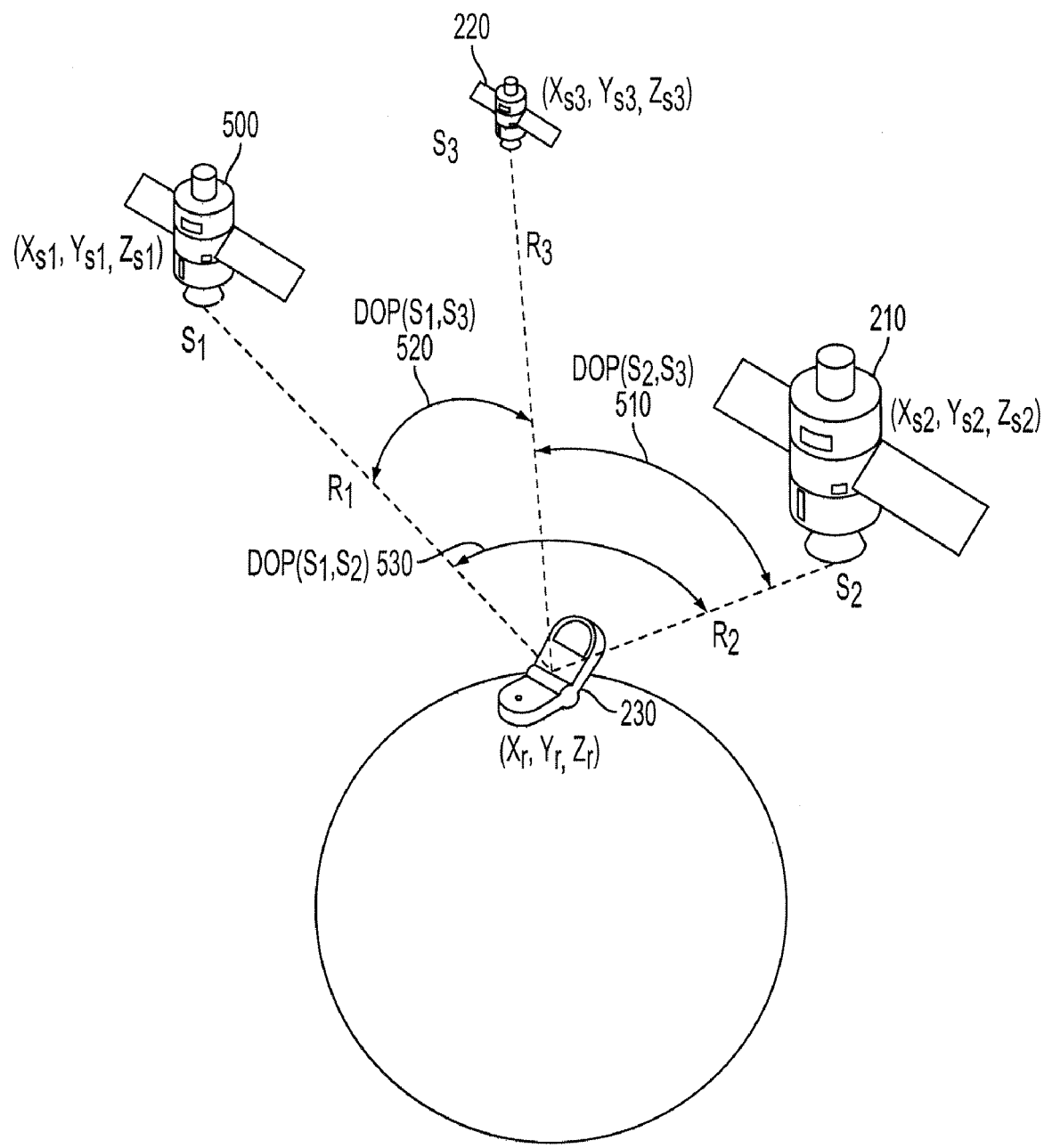
FIG. 5 illustrates a three satellite embodiment and the respective $DOP_2$ values, according to an embodiment of the present disclosure.

Another aspect of the present disclosure relates to evaluating the quality of satellite geometry where three satellites are in view. The case with three satellites is very similar to the two satellites embodiment. It is assumed that a positioning system has an IEL and is able to acquire signal from three satellites including pseudorange estimates and satellite information from these three satellites. To illustrate the concept of the present embodiment, FIG. 5 depicts a three satellite constellation; including a first satellite 210, a second satellite 220, and a third satellite 500 all located above the receiver location 230. DOP(S1,S2) 530 refers to the angle between first satellite and second satellite, DOP(S1,S3) 520 is the angle between the first satellite and third satellite, and DOP(S2,S3) 510 is the angle between the second satellite and third satellite.

The three satellite embodiment proposes three different approaches to obtain the relationship geometry between the satellites and the IEL. The first approach is similar to the case with two satellites: the positioning system obtains the angles between each pair of satellites, and based on the obtained angles it evaluates the quality of the satellite measurements. The first approach yields a value $DOP_{3a}$.

The second approach is to use the position information of the satellites and form a $DOP_3$ matrix (similar to traditional DOP matrix in SPS systems). The difference between the proposed matrix and traditional DOP matrix is the exclusion of the time inaccuracies from the DOP matrix (i.e. exclusion of the last column in the matrix, containing −1 for all satellites). The approach then continues similar to the traditional DOP method. The second approach yields a value $DOP_{3b}$.

The third approach is to translate the problem into a trigonometric problem by transforming the individual elements of the $DOP_3$ matrix defined in the second approach to their equivalent trigonometric functions and simplifying the matrix. The positioning system then relates the geometry of the visible satellites to the quality of set of satellites to be used in positioning system. The third approach yields a value $DOP_{3c}$.

If the metrics corresponding to the geometry fulfill the preferred guidelines, the positioning system can employ the measurements from these three satellites to refine the initial location and improve the quality of estimated location. Note that although the approaches are different in scale, they behave similarly. The $DOP_3$ metrics obtained from these approaches indicate if the current set of three satellites is usable for positioning. All three approaches result in a $DOP_3$ metric (different from the $DOP_3$ matrix), which if sufficiently small, can indicate the geometry of satellites is good for positioning.

Below, we explain these three different approaches to find a form of $DOP_3$ metric for the three satellite case, where only three satellites are visible to the receiver and the receiver is able to receive information from these three satellites.

First Approach

In the first method for the case of three satellites, similar to the method described for two satellites, we find the angles between the vectors connecting the predicted receiver location and each pair of satellites.

If the angles between each pair of satellites were in $\Theta$, we can use all the three satellites for positioning, since they would all be well spread in the sky. If one pair had an angle not in $\Theta$, we can reject that pair and select either of the remaining two pairs.

In this embodiment, $DOP_{3a}=(DOP_2(S_1,S_2), DOP_2(S_1,S_3), DOP_2(S_2,S_3))$ where $DOP_2(S_1,S_2)$ represents the angle between $S_1$ and $S_2$, $DOP_2(S_1,S_3)$ represents the angle between $S_1$ and $S_3$ and $DOP_2(S_2,S_3)$ represents the angle between $S_2$ and $S_3$. If all the $DOP_2$ values were more than the threshold, we could use all the three satellites for positioning, otherwise, two satellites would be close to one another and at least one of them would have to be rejected for positioning.

For example, if $|\hat{DOP}_2(S_1,S_2)|$ exceeds the threshold, we learn that $S_1$ and $S_2$ are close to one another and hence only one of them can be used for positioning.

The threshold for $DOP_{3a}$ and its subset $DOP_2$ values can be different from the case of two satellites only. In this case, we can restrict the spread of the satellites differently and increase the angle threshold. For example, we can define the angle threshold, $\gamma_3°$ to be around 35°. In such case, each individual $DOP_2$ value is compared against a new threshold. The restriction on the angle between satellites can be less strict when we have three satellites in view. Generally, having three satellites can provide better location estimation than cases with two satellites. The range of angles between satellites which are beneficial to hybrid positioning can be defined as angles between 35 degrees and 145 degrees.

If only one set of satellites had an angle smaller than $\gamma_3°$, i.e. $ANGLE(S_2,S_3) \notin \Theta$, we can use either $(S_1,S_2)$ or $(S_1,S_3)$. The selection of satellites can be determined using another SPS metric, such as signal-to-noise ratio.

If two sets had angles smaller than $\gamma_3°$, i.e. only $ANGLE(S_1S_2) \in \Theta$, we have to use the remaining set, $(S_1,S_2$ as the final satellite selection. Finally, if all three sets had angles smaller than $\gamma_3°$, we can conclude that all satellites are located in the same region of the sky and the set cannot be used for accurate positioning. The best scenario consists of three satellites with pair-wise angles in $\Theta$ which means the geometry of current set of satellites is good for positioning and the positioning system (such as integrated WLAN-PS and SPS environments) can use all three satellites to both obtain a better location and to improve the quality of estimate of the reported location.

It is also possible to compare the results of vector manipulation to another threshold to calculate the $\hat{DOP}_{3a}$ value.

We can define the following as an alternate $DOP_3$ value $\hat{DOP}_{3a} = (v_1 \cdot v_2, v_1 \cdot v_3, v_2 \cdot v_3)$ when the vectors are normalized or $$D\hat{O}P_{3a} = \left( \frac{v_1 \cdot v_2}{\|v_1\| \|v_2\|}, \frac{v_1 \cdot v_3}{\|v_1\| \|v_3\|}, \frac{v_2 \cdot v_3}{\|v_2\| \|v_3\|} \right)$$

when they are not normalized and we compare it to another threshold to decide if the set of satellite is usable for positioning.

For example, if we decide to use the 35° degree threshold and reject satellites separated by an angle less than 35°, we can find $$\varphi_3 = \cos\left(\frac{35 \times \pi}{180}\right) = 0.8192,$$

where $\phi_3$ is the threshold. We then compare all components of $D\hat{O}P_{3a}$ to $\phi_3$. The process can be summarized as follows.

If $ANGLE(S_2,S_3) \notin \Theta$, while $ANGLE(S_1,S_2) \in \Theta$ and $ANGLE(S_1,S_3) \in \Theta$, then we have to choose between either $(S_1,S_2)$ and $(S_1,S_3)$. The selection can be performed using other SPS metrics such as signal-to-noise ratio. If only $ANGLE(S_1,S_2) \in \Theta$ while $ANGLE(S_2,S_3) \notin \Theta$ and $ANGLE(S_1,S_3) \notin \Theta$, we must use the $(S_1,S_2)$.

If $ANGLE(S_1,S_2) \notin \Theta$, $ANGLE(S_2,S_3) \notin \Theta$, and $ANGLE(S_1,S_3) \notin \Theta$, then we conclude than this set of satellites is not well spread in sky and are located in the same region. Therefore, they cannot be used for positioning. Finally, if the entire set had good geometry characteristics, i.e. $ANGLE(S_1,S_2) \in \Theta$, $ANGLE(S_2,S_3) \in \Theta$, and $ANGLE(S_1,S_3) \in \Theta$, we can use all three satellites for positioning.

In another embodiment of this invention, we propose to use these three metrics to weigh the estimated position and provide a better final position. In order to do so, we can find the estimated location based on initial location and set of $(S_1,S_2)$. We also find the estimated location based on initial location and set of $(S_1,S_3)$ and initial location and set of $(S_2,S_3)$. Then we weight these three estimated locations based on individual DOP metrics of each set.

The assigned weights in the above method can be related to DOP values of each pair of the three satellites. For example, if one of the methods described earlier to obtain the DOP values, we know that the 1.4 is the best DOP value that system can obtain and 5 is much worse value for DOP. Now, if with three satellite, we obtain three angles of $ANGLE(S_1,S_2)$ with DOP of 1.4, $ANGLE(S_1,S_3)$ with DOP of 5, and $ANGLE(S_2,S_3)$ with DOP of 10. We find the three refined location estimates using IEL and $(S_1,S_2)$ as $(X_1,Y_1,Z_1)$, IEL and $(S_1,S_3)$ as $(X_2,Y_2,Z_2)$, and IEL and $(S_2,S_3)$ as $(X_3,Y_3,Z_3)$. Then, our final location estimate comes from a combination of these refined locations with weights related to DOPs. We can use $$\frac{1}{DOP}$$

as the weights for each refined location and define the final location as $$X_F = \frac{\frac{1}{DOP_1}X_1 + \frac{1}{DOP_2}X_2 + \frac{1}{DOP_3}X_3}{\frac{1}{DOP_1} + \frac{1}{DOP_2} + \frac{1}{DOP_3}}$$

$$Y_F = \frac{\frac{1}{DOP_1}Y_1 + \frac{1}{DOP_2}Y_2 + \frac{1}{DOP_3}Y_3}{\frac{1}{DOP_1} + \frac{1}{DOP_2} + \frac{1}{DOP_3}}$$

$$Z_F = \frac{\frac{1}{DOP_1}Z_1 + \frac{1}{DOP_2}Z_2 + \frac{1}{DOP_3}Z_3}{\frac{1}{DOP_1} + \frac{1}{DOP_2} + \frac{1}{DOP_3}}$$

Similar approaches can be used to define other weights or we can use predetermined weights for each set. It should be noted that if DOP values were obtained with another method, we can adjust the weights to take that change into consideration.

The calculation of $DOP_{3a}$ is computationally simple and fast as it requires simple vector manipulations and comparison. However, it performs relatively less accurate as it only compares each pair of satellites and not all three of them simultaneously.

Second Approach

The second method of finding an alternative $DOP_3$ metric consists of matrix manipulations. Defining the unit vectors from IEL to each satellite, i.e. $v_i = (\Delta x_i, \Delta y_i, \Delta z_i)$, where its components are defined as $$\Delta x_i = \frac{x_r - x_{s_i}}{R_i}$$

$$\Delta y_i = \frac{y_r - y_{s_i}}{R_i}$$

$$\Delta z_i = \frac{z_r - z_{s_i}}{R_i}$$

$$R_i = \sqrt{(x_r - x_{s_i})^2 + (y_r - y_{s_i})^2 + (z_r - z_{s_i})^2}$$

gives us another geometry matrix or G' matrix defined as $$G' = \begin{bmatrix} \Delta x_1 & \Delta y_1 & \Delta z_1 \\ \Delta x_2 & \Delta y_2 & \Delta z_2 \\ \Delta x_3 & \Delta y_3 & \Delta z_3 \end{bmatrix}$$

Note that the above G' matrix is very similar to the G matrix discussed above excluding the time variations. For an alternative $DOP_3$ metric calculation we can ignore the variations of time and its effect on the geometry of the satellites and focus on the limitations of the satellite geometry itself.

Advancing with the above procedure, similar to DOP matrix, we can form the $H' = G'^T \times G'$ matrix and find its inverse, i.e. $H'^{-1}$. The diagonal elements of $H'^{-1}$ will yield the desired $DOP_3$ value.

$$DOP_{3b} = \sqrt{H'^{-1}_{11} + H'^{-1}_{22} + H'^{-1}_{33}}$$

It is also possible to obtain the $DOP_{3b}$ value without actually inverting the H matrix.

Assume $$A = \begin{bmatrix} a_{11} & a_{12} & a_{13} \\ a_{21} & a_{22} & a_{23} \\ a_{31} & a_{32} & a_{33} \end{bmatrix}$$

Then we have $|A| = a_{11}(a_{22}a_{33} - a_{32}a_{23}) - a_{21}(a_{12}a_{33} - a_{13}a_{32}) + a_{31}(a_{12}a_{23} - a_{13}a_{22})$ And $A_{11}^{-1} = a_{22}a_{33} - a_{23}a_{32}$ $A_{22}^{-1} = a_{11}a_{33} - a_{13}a_{31}$ $A_{33}^{-1} = a_{11}a_{22} - a_{12}a_{21}$ And finally, $$DOP_{3b} = \sqrt{\frac{1}{|A|}(A_{11}^{-1} + A_{22}^{-1} + A_{33}^{-1})}$$

Observe that H is a symmetric matrix and some elements are equal to one another. To more efficiently calculate $DOP_{3b}$, we can ignore the square root sign and compute $A_{11}^{-1}$, $A_{22}^{-1}$, and $A_{33}^{-1}$ and use them to find $|A|$. This will save computational resources.

$DOP_{3b}$ is more accurate than $DOP_{3a}$ as it uses all three satellites and their respective position to find a $DOP_3$ metric. However, it is computationally more expensive and more time consuming than $DOP_{3a}$ as it requires considerably more vector manipulations. In applications where computational power is not limited and we can perform fast algebraic matrix manipulations, $DOP_{3b}$ is preferred.

Third Approach

The third method to find a $DOP_3$ value for the case of three satellites, involves transforming the G matrix into trigonometric functions and simplifying the $DOP_{3c}$ answer.

Figure 6:
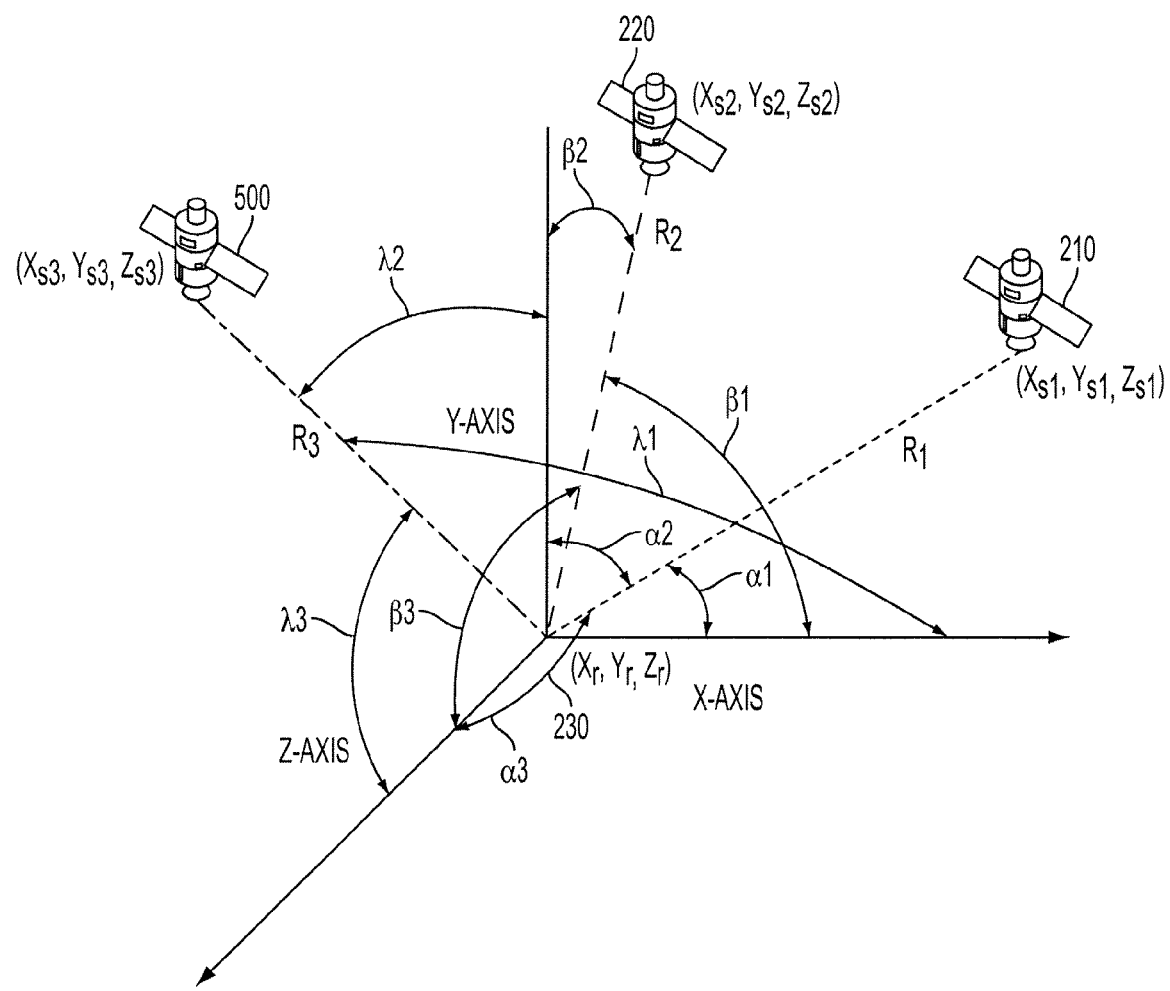
FIG. 6 illustrates three satellites in 3D space, including their angles with respect to each axis, according to an embodiment of the present disclosure.

FIG. 6 illustrates the concept and different angles. FIG. 6 depicts a three satellite embodiment of the present teachings; including a first satellite 210, a second satellite 220, and a third satellite 500 all located above the receiver location 230. $\alpha_1$ represents the angle between the first satellite and x-axis of the Cartesian coordinates. $\alpha_2$ represents the angle between the first satellite and y-axis and $\alpha_3$ represents the angle between the first satellite and z-axis. Similarly, $\beta_1$ represents the angle between the second satellite and x-axis, $\beta_2$ represents the angle between the second satellite and y-axis and $\beta_3$ represents the angle between the second satellite and z-axis. Finally, $\gamma_1$, $\gamma_2$, and $\gamma_3$ represent the angles between the third satellite and x-axis, y-axis, and z-axis, respectively.

In order to proceed, we can denote the $G_1$ matrix as;

$$G = \begin{bmatrix} \cos(\alpha_1) & \cos(\alpha_2) & \cos(\alpha_3) \\ \cos(\beta_1) & \cos(\beta_2) & \cos(\beta_3) \\ \cos(\lambda_1) & \cos(\lambda_2) & \cos(\lambda_3) \end{bmatrix}$$

where the angles are between connecting line of each satellite and receiver location and x, y, and z axes.

It is possible to rotate the x, y, and z axes such that the x axis falls exactly on the connecting line between the first satellite 210 and the receiver location. Simultaneously, the rotation can be performed such that the connecting line between the second satellite 20 and receiver location 230 falls on the x-y plane. The third satellite, 500, can be anywhere in the 3D space, as illustrated in FIG. 7.

Figure 7:
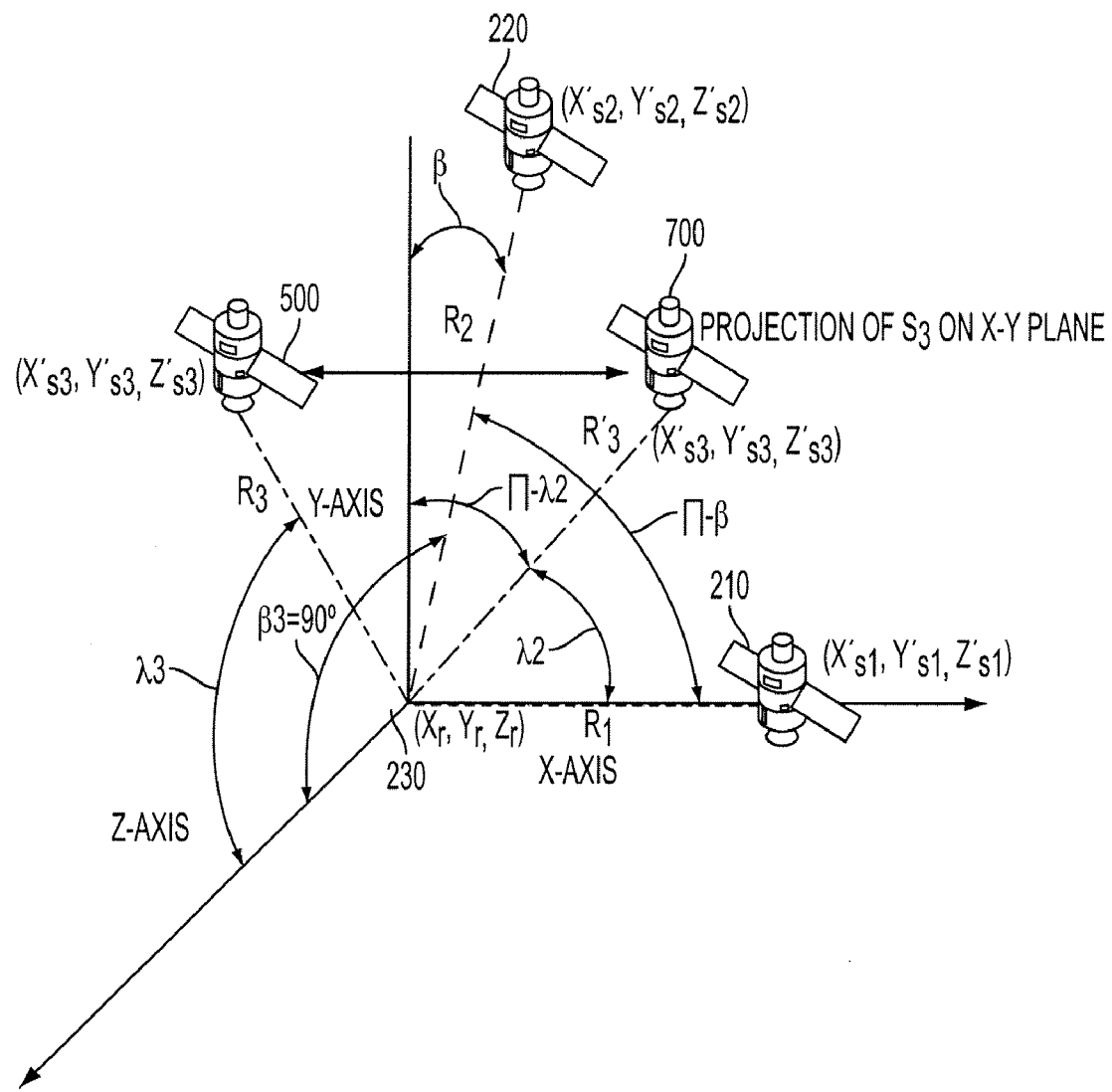
FIG. 7 illustrates the configuration of FIG. 6 in 3D space where the first satellite is on the x-axis and the second satellite in on x-y plane, according to an embodiment of the present disclosure.

Similar to FIG. 6, FIG. 7 depicts a three satellite embodiment of the present teachings; including a rotated first satellite 210, a rotated second satellite 220, a projected third satellite 500 all located above the receiver location 230. In the new coordinates $\alpha_1$ which represents the angle between the first satellite and x-axis of the Cartesian coordinates is 0. $\alpha_2$ and $\alpha_3$ are both 90 degrees as the rotated satellites lies on the x-axis. Similarly, $\beta_1$ and $\beta_2$ represents the angle between the rotated second satellite and x-axis and y-axis, respectively. Since the rotated second satellite is on the x-y plane, $\beta_3$ is 90 degrees. Similar to the previous case, $\gamma_1$, $\gamma_2$, and $\gamma_3$ represent the angles between the third satellite and x-axis, y-axis, and z-axis, respectively.

In order to use fewer parameters and numbers, one can represent the rotated third satellite with only two angles. In order to proceed, we have to project the rotated third satellite on the x-y plane. The result is the projected rotated third satellite 700. The angle between the rotated satellite and z-axis is referred to as $\lambda_1$ and the angle between the projected rotated third satellite and x-axis is $\lambda_1$ which give $$\frac{\pi}{2} - \lambda_2$$

as the angle between the projected rotated third satellite and y-axis.

The rotation changes our $G_1$ matrix to a second matrix, $G_2$, a rotated geometry matrix $$G = \begin{bmatrix} 1 & 0 & 0 \\ \cos(\beta) & \sin(\beta) & 0 \\ \cos(\lambda_2)\sin(\lambda_1) & \sin(\lambda_2)\sin(\lambda_1) & \cos(\lambda_1) \end{bmatrix}$$

where the angles are shown in FIG. 7.

Forming the H matrix from the $G_2$ matrix and its inverse we have;

$H = G^T \times G$ $= \begin{bmatrix} 1 & \cos(\beta) & \cos(\lambda_2)\sin(\lambda_1) \\ 0 & \sin(\beta) & \sin(\lambda_2)\sin(\lambda_1) \\ 0 & 0 & \cos(\lambda_1) \end{bmatrix} \times$ $\begin{bmatrix} 1 & 0 & 0 \\ \cos(\beta) & \sin(\beta) & 0 \\ \cos(\lambda_2)\sin(\lambda_1) & \sin(\lambda_2)\sin(\lambda_1) & \cos(\lambda_1) \end{bmatrix}$ $= \begin{bmatrix} 1 + \cos^2(\beta) + \cos^2(\lambda_2)\sin^2(\lambda_1) & \cos(\beta)\sin(\beta) + \cos(\lambda_2)\sin(\lambda_2)\sin^2(\lambda_1) & \sin(\lambda_1)\cos(\lambda_1)\cos(\lambda_2) \\ \cos(\beta)\sin(\beta) + \cos(\lambda_2)\sin(\lambda_2)\sin^2(\lambda_1) & \sin^2(\beta) + \sin^2(\lambda_1)\sin^2(\lambda_2) & \sin(\lambda_1)\cos(\lambda_1)\sin(\lambda_2) \\ \sin(\lambda_1)\cos(\lambda_1)\cos(\lambda_2) & \sin(\lambda_1)\cos(\lambda_1)\sin(\lambda_2) & \cos^2(\lambda_1) \end{bmatrix}$ Given our H matrix, we invert the H matrix to obtain $H^{-1}$. After inverting the H matrix, we use the diagonal elements of $H^{-1}$ to obtain the DOP value. In order to simplify the answer trigonometric identities and algebra are used. Simplifying the final DOP answer, $DOP_{3C}=\sqrt{H'^{-1}_{11}+H'^{-1}_{22}+H'^{-1}_{33}}$, we have $$DOP_{3c} = \sqrt{\frac{2}{\sin^2(\beta)} + \frac{1}{\cos^2(\lambda_1)} + \frac{\sin^2(\lambda_1)[\sin^2(\lambda_2) + \sin^2(\lambda_2 - \beta)]}{\sin^2(\beta)\cos^2(\lambda_1)}}$$

For saving computational resources, we can ignore the square root sign and merge the entire fraction.

$$D\hat{O}P_{3c} = \frac{2\cos^2(\lambda_1) + \sin^2(\beta) + \sin^2(\lambda_1)[\sin^2(\lambda_2) + \sin^2(\lambda_2 - \beta)]}{\sin^2(\beta)\cos^2(\lambda_1)}$$

This method is preferred when the angles between the satellites and rotated axes are computed externally and fed to the system. In such cases, it is very easy to find the trigonometric values of the angles and calculate $DOP_{3c}$. It is computationally more efficient and less time consuming than other methods. The projection of the third satellite on the new x-y plane results in a simpler matrix than the second method and hence finding the $DOP_{3c}$ metric becomes faster. However, if the angles are not provided externally and are to compute in the system, the algorithm is less efficient than either of the previous methods.

The many features and advantages of the embodiments of the present invention are apparent from the detail specification, and thus, it is intended to cover all such features and advantages of the invention that fall within the true spirit and scope of the invention. All suitable modifications and equivalents maybe resorted to, falling within the scope of the invention.

What is claimed is:

1. A method for determining position of a device in a hybrid positioning system, the method comprising:
    determining an initial position estimate of a device using a non-satellite positioning system;
    obtaining satellite measurements from three satellites, wherein the measurements include each satellite's position with respect to the initial position estimate;
    determining a dilution of precision (DOP) based on the satellite measurements;
    if the DOP is small, refining the initial position estimate using the satellite measurements; and
    if the DOP is large, providing the initial estimate as a final position estimate for the device.

2. The method of claim 1, wherein the non-satellite positioning system is a WLAN positioning system.

3. The method of claim 1, wherein the DOP is related to the angle between two of the three satellites with respect to the initial position estimate.

4. The method of claim 1 comprising:
    grouping the three satellites into three groups of two satellites;
    determining an angle between each of the two satellites with respect to the initial position determination for each group; and
    selecting two or more satellites from the group of three satellites based on the angles measured, wherein satellites having large angles between them are selected and satellites having small angles in between them are not selected.

5. The method of claim 4, wherein the DOP is related to an aggregate of the angles between each pair of three satellites with respect to the initial position estimate.

6. The method of claim 1, wherein a large DOP corresponds to satellites that display poor geometry in reference to the location of the device.

7. The method of claim 6, wherein a large value of DOP comprises 3.0.

8. The method of claim 1, wherein a small DOP corresponds to satellites that display good geometry in reference to the location of the device.

9. The method of claim 7, wherein a small value of DOP comprises a value between about 1.4 to about 2.5.

10. The method of claim 1, wherein the initial position estimate is refined when the DOP is smaller than 1.65.

11. The method of claim 1, wherein the hybrid positioning system constructs a satellite vector corresponding to a vector from the initial position to each satellite.

12. The method of claim 11, wherein the DOP of a set of two satellites is determined using the dot product of the satellite position vectors for each satellite.

13. The method of claim 12, wherein a small value of DOP comprises a value between 0 and 0.85.

14. The method of claim 12, wherein a large value of DOP comprises a value greater than or equal to 0.86.

15. A method for determining position of a device in a hybrid positioning system, the method comprising:
    determining an initial position estimate of a device using a non-satellite positioning system;
    obtaining satellite measurements from three satellites, wherein the measurements include each satellite's position with respect to the initial position estimate;
    grouping the three satellites into three groups of two satellites;
    determining an angle between each of the two satellites with respect to the initial position determination for each group; and
    selecting two or more satellites from the group of three satellites based on the angles measured, wherein satellites having large angles between them are selected and satellites having small angles in between them are not selected.

16. The method of claim 15, wherein the DOP is related to an aggregate of the angles between each pair of three satellites with respect to the initial position estimate.

17. The method of claim 15, wherein the hybrid positioning system constructs a satellite vector corresponding to the vector from the initial position to each satellite.

18. The method of claim 15, wherein the angle between each of the two satellites with respect to the initial position determination is the DOP for each group.

19. The method of claim 15, wherein the non-satellite positioning system is a WLAN positioning system.

20. A method for determining position of a device in a hybrid positioning system, the method comprising:
    determining an initial position estimate of a device using a non-satellite positioning system;
    obtaining satellite measurements from three satellites, wherein the measurements include each satellite's position with respect to the initial position estimate;
    grouping the three satellites into three groups of two satellites;

determining an angle between each of the two satellites with respect to the initial position determination for each group, wherein the angle is the DOP for each group;

determining three intermediate positions for the device using each group of two satellites;

weighting the three intermediate positions for the device using the DOP for each group of two satellites; and determining a final position of the device by averaging the weighted intermediated positions.

21. The method of claim 20, wherein the non-satellite positioning system is a WLAN positioning system.

* * * * *